United States Patent [19]

Zeller

[11] 4,257,363
[45] Mar. 24, 1981

[54] METHOD AND APPARATUS FOR CONTROLLING AN INTERNAL COMBUSTION ENGINE DURING AND AFTER ENGINE BRAKING

[75] Inventor: Hans Zeller, Grafenau, Fed. Rep. of Germany

[73] Assignee: Robert Bosch GmbH, Stuttgart, Fed. Rep. of Germany

[21] Appl. No.: 935,831

[22] Filed: Aug. 22, 1978

[30] Foreign Application Priority Data

Aug. 29, 1977 [DE] Fed. Rep. of Germany ....... 2738886

[51] Int. Cl.³ .............................. F02P 5/02; F02B 5/02
[52] U.S. Cl. ..................................... 123/423; 123/493
[58] Field of Search ........ 123/32 EL, 32 EH, 32 EA, 123/117 R, 117 A, 198 DB, 97 B

[56] References Cited

U.S. PATENT DOCUMENTS

| | | | |
|---|---|---|---|
| 3,476,094 | 11/1969 | Rucins et al. | 123/117 A |
| 3,683,869 | 8/1972 | Kamazuka et al. | 123/97 B |
| 3,683,877 | 8/1972 | Mennesson | 123/32 EA |
| 3,794,003 | 2/1974 | Reddy | 123/32 EA |
| 3,935,845 | 2/1976 | Aono et al. | 123/32 EA |
| 3,978,832 | 9/1976 | Walker et al. | 123/117 A |
| 4,051,823 | 10/1977 | Mogi et al. | 123/117 A |
| 4,068,632 | 1/1978 | Kanaida et al. | 123/117 A |
| 4,126,107 | 11/1978 | Harada et al. | 123/32 EH |

Primary Examiner—P. S. Lall
Attorney, Agent, or Firm—Edwin E. Greigg

[57] ABSTRACT

An ignition control device for changing the ignition timing of an internal combustion engine during and after the occurrence of engine braking, i.e., during a condition of increased speed and low load, as during coasting. The device includes a circuit which receives signals related to engine load and engine speed and determines therefrom the onset of engine braking. The device then retards the engine timing so as to reduce the amount of positive engine torque, whereafter the fuel supply may be entirely shut off. Upon establishment of normal operation or idling, the fuel supply is restored and the ignition timing is gradually returned to the normal setting.

15 Claims, 9 Drawing Figures

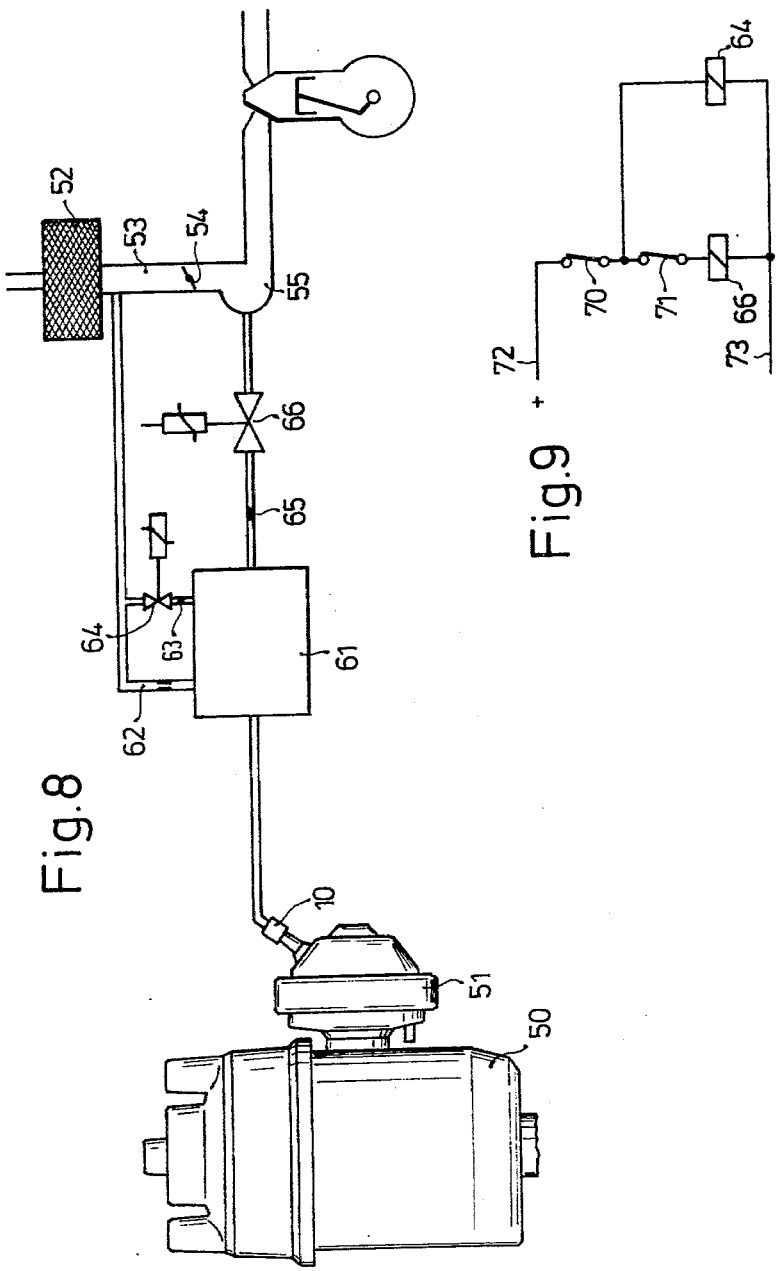

METHOD AND APPARATUS FOR CONTROLLING AN INTERNAL COMBUSTION ENGINE DURING AND AFTER ENGINE BRAKING

BACKGROUND OF THE INVENTION

The invention relates to a method and an apparatus for controlling the operation of an internal combustion engine during and after engine braking, thereby improving driver comfort and diminishing the concentration of toxic exhaust components. The invention relates more particularly to a method and apparatus for changing the engine timing in a manner related to the occurrence of engine braking.

During engine braking or overrunning, there exists a state of operation in which the engine delivers no torque to the vehicle but is turned at a speed higher than that which would result from a given load condition and a given throttle position due to the momentum of the vehicle in which it is installed. In such a state of operation, the accelerator pedal would normally be permitted to assume its zero position. In particular, if the accelerator pedal is released while the vehicle is in normal operation, the engine will enter a condition of engine braking. This condition may be accompanied, as is usually the case, by actuation of the wheel brakes but is may also occur, for example, in downhill operation, without application of the wheel brakes.

The engine braking which takes place under these conditions is normally desired. However, to insure the most effective degree of engine braking, the engine must be prevented from delivering a positive torque, i.e., the combustion processes must either be suppressed or must be conducted with such timing as would prevent the delivery of positive torque. Generally, the fuel supply is entirely interrupted which results in fuel economy and is referred to as fuel cut-off or engine braking cut-off. In order to insure that the engine will operate properly at idling speed, however, the fuel supply is restored when the engine speed has dropped to a so-called reinstatement speed hereinafter labeled "nW." Fuel cut-off during engine braking may take place, in principle, in all fuel injection systems and even in engines having carburetors with the aid of solenoid valves associated with the idling mechanism of the engine. Fuel cut-off has the advantage of providing fully effective engine braking and a substantial saving in fuel, especially when the vehicle is operated in heavy traffic.

The invention constitutes an improvement of a fuel supply system for an internal combustion engine in which the fuel supply is shut off during engine braking until a reinstatement speed nW has been reached. Subsequently, the combustion chambers of the engine again receive fuel. It has been shown in practice that, when the fuel supply is reinitiated, the vehicle is subjected to a certain forward lurch or jolt which leads to driver discomfort. In addition, the emission of toxic substances is increased for some time, after the reinitiation of fuel supply because the engine generally is cooled off substantially during engine braking and the formation of a satisfactory optimum mixture is difficult, thereby preventing full combustion.

OBJECT AND SUMMARY OF THE INVENTION

It is an object of the present invention to provide a method and apparatus for so controlling the engine operation during and after engine braking that the aforementioned jolt during fuel resupply is prevented. This object is attained by changing the engine timing in the direction of retardation at a point associated with the onset or the progress of the engine braking or, again, beginning with a particular engine speed. It is a further object of the invention to generate a release signal which permits a return of the engine timing to its normal value according to a selectable function. By shifting the engine timing to a substantial retardation, the combustion processes only serve for heating the engine and do not produce substantial engine torque. The rapid heating insures that the normal engine temperature is reached soon after engine braking stops, thereby permitting the complete and optimum combustion which has a minimum of toxic exhaust gas components. It is a further object of the invention to still further increase the degree of heating of the engine when engine braking terminates by enriching the fuel-air mixture at that time.

In a particular feature of the invention, the spark retardation takes place at the onset of engine braking, whereas the fuel supply is interrupted only at some time thereafter. This combination of features also improves driver comfort by permitting a very gentle transition from normal vehicle operation to engine braking or engine overrunning.

The invention will be better understood as well as further objects and advantages thereof become more apparent from the ensuing detailed description of preferred exemplary embodiments of the invention taken in conjunction with the drawing.

BRIEF DESCRIPTION OF THE DRAWING

FIG. 4 is a set of diagrams illustrating the events occurring during engine braking wherein FIG. 4a is a diagram showing the throttle angle as a function of time;

FIG. 4b illustrates the occurrence of the timing retardation signal;

FIG. 4c is a diagram of the fuel delivery signal as a function of time;

FIG. 4d is a diagram illustrating the timing retardation angle as a function of time;

FIG. 8 is a schematic diagram of a pneumatic timing control according to the invention; and FIG. 9 is a diagram illustrating the electrical actuation of the solenoids in FIG. 8.

DESCRIPTION OF THE PREFERRED EMBODIMENTS

Figure 1:
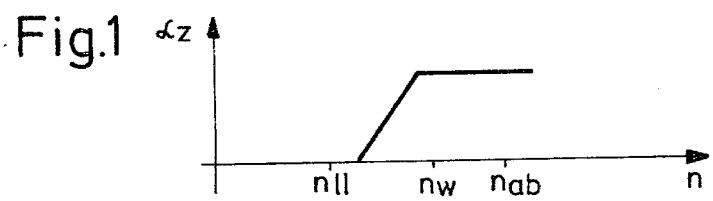
FIG. 1 is a diagram depicting the variation of timing angle as a function of engine speed during engine braking.

The illustration of FIG. 1 depicts the ignition timing angle as a function of engine speed, with the positive ordinate indicating late timing. The engine speed nLL refers to the idling speed, the engine speed marked nW refers to the fuel restoring speed and the time marked nab refers to the fuel shut-off speed. The fuel shut-off speed nab is that speed above which fuel supply will be interrupted with a closed throttle. As the resupply speed nW the fuel supply is reinitiated so as to permit a proper operation of the engine at idling speed. The speed difference between nab and nW serves as a hysteresis to prevent oscillations between fuel supply and fuel shut-off. FIG. 1 illustrates that the timing angle remains retarded as the speed declines down to a speed which lies well below the fuel resupply speed nW and is thereafter returned to an angle shown to be near zero degrees but actually referring to the angle which is proper and suitable for idling operation of the particular engine in which the invention is used.

By changing the engine timing in the manner depicted in FIG. 1, the engine torque is low when fuel is resupplied due to the fact that the timing is still retarded at that time.

Figure 2:
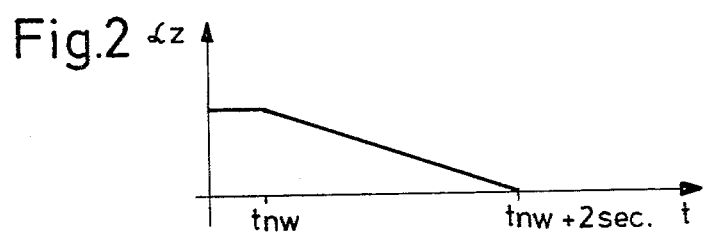
FIG. 2 is a diagram illustrating the ignition timing angle as a function of time near the termination of engine braking.

FIG. 2 illustrates the reduction of the amount of late timing, i.e., a reduction of the late timing angle $a_z$ beginning with the point at which the resupply speed nW is reached by the engine during deceleration. According to the diagram of FIG. 2, the late timing is reduced linearly with respect to time during a period of approximately two seconds. The change in FIG. 1, however, is linear with respect to engine speed.

The diagrams of both FIGS. 1 and 2 treat the case in which the resupply speed nW is reached without any application or depression of the accelerator pedal, i.e., at a closed throttle, so that the engine speed is reduced due to friction or external load.

Figure 3:
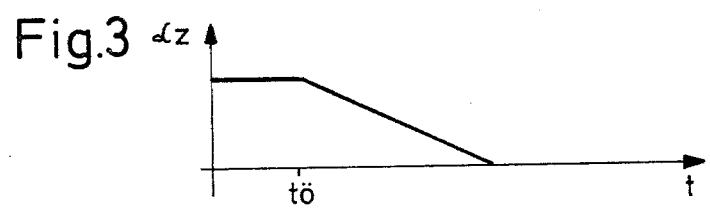
FIG. 3 is a diagram illustrating the ignition timing angle as a function of time subsequent to throttle opening and after engine braking.

FIG. 3 illustrates the change in the timing angle $a$ as a function of time in which the timing retardation is reduced at the moment the throttle is reopened. The final timing angle is shown to intersect the abscissa but may be at some angle other than zero degrees. This illustration characterizes the case in which the operator of the vehicle arbitrarily terminates engine braking by application of the throttle.

Figure 4:
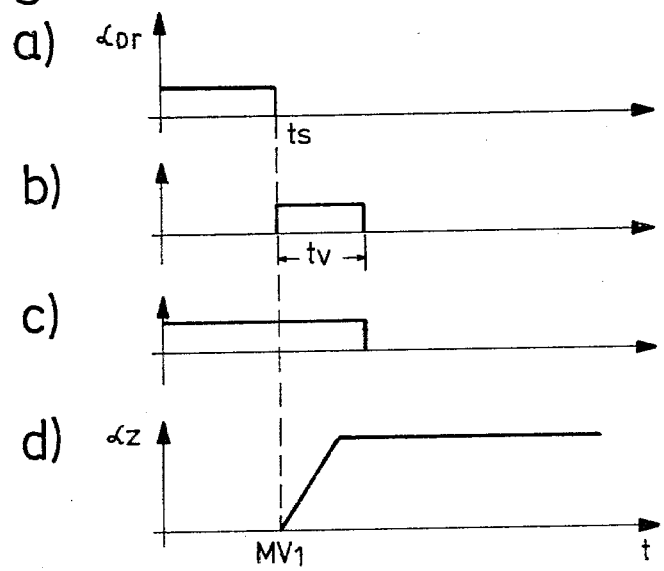

The general situation occurring during engine braking is depicted in a series of diagrams in FIG. 4. In particular, FIG. 4a illustrates the throttle angle, i.e., the angle of opening of the throttle valve, as a function of time. The throttle is shown to be opened to a constant angle up to a point ts which is the time at which it closes and engine braking may be said to initiate. At that time, a delay of length tv is begun as illustrated in FIG. 4b. At the expiration of the delay tv, fuel shut-off occurs as illustrated in FIG. 4c. In order to insure a smooth and gentle transition from normal engine, i.e., vehicle, operation, to engine braking, the ignition timing is retarded from its normal value (zero or otherwise) to a retarded value beginning at the time marked mvl, and the process of timing retardation is completed before fuel shut-off, as a comparison with FIG. 4c will show. The operation illustrated and discussed above may be performed by an apparatus schematically shown in FIG. 5. This apparatus comprises three sections, namely a timing section 10, a fuel injection section 11 and a sensor section including a tacho-generator 12, a throttle valve position indicator 13 for generating a closed throttle signal and an air flow rate meter 14 which generates a signal related to air flow in the induction tube.

The timing section 10 is chiefly characterized by a timing control circuit 20 which determines the optimum engine timing, i.e., the correct timing angle, on the basis of the prevailing engine speed and signals related to instantaneous pressures. Following the timing control circuit 20 is a timing adjustment circuit 21 which operates in dependence on the output signal or of an ignition timing shifter circuit 22 and actuates a synchronizing circuit 23 which sets the ignition timing angle in relation to top dead center for providing an ignition signal to the spark plugs 24 at the desired time. The timing shifter circuit 22 receives its input signals from an engine braking detection circuit 25, the tacho-generator 12 and from the throttle position transducer 13. The switches in the lines coming from the transducers 12 and 13 serve the purpose of selective connection of the timing shifter on one or the other of the transducers.

Figure 5:
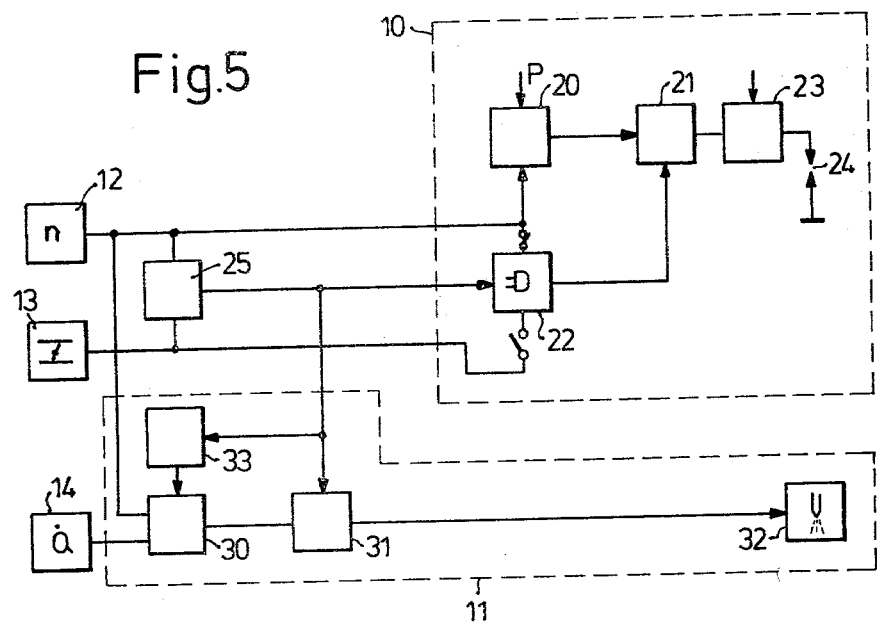
FIG. 5 is an overall block diagram of the method and apparatus of the invention.

The fuel injection section 11 of the apparatus in FIG. 5 includes a control pulse generator 30 which generates a train of fuel injection control pulses having a length tp which depends on engine speed and air flow rate. Following the circuit 30 is a clipper circuit 41 in which the signals from the pulse generator 30 are delayed, shortened, or suppressed. The output signals of the clipper circuit are fed to a fuel injection mechanism including at least one electromagnetic fuel injection valve 32. Finally, the injector section of the apparatus includes an enrichment circuit 33 connected to the pulse generator circuit 30 for providing a fuel mixture enrichment at the end of engine braking by appropriate prolongation of the injection control pulse generated in the pulse generator 30. The illustrated disposition of separate units in the ignition control section 10, i.e., the timing control circuit 20, the timing adjustment circuit 21 and the synchronizing circuit 23, is merely exemplary and may be modified, in particular may be joined in the same circuit, depending on the ignition system. However, this disposition is advantageous when employed in conjunction with an electronic ignition system.

In normal vehicle operation, the ignition section 10 generates ignition pulses at particular times, i.e., at particular timing angles, and in dependence on the commonly used variables induction tube pressure and engine speed. At the same time, the fuel injection control section 11 generates control pulses on the basis of engine speed and induction tube air flow rate and transmits these control pulses to the electromagnetic fuel injection valves 32.

When the engine braking detection circuit 25, which monitors the engine speed and the throttle valve position, detects the condition of engine braking, it actuates the ignition timing shifter circuit 22 which causes a shift of the engine timing toward retardation, i.e., late ignition. In order to perform the readjustment from late ignition to normal engine timing as depicted in the diagram of FIG. 1, the timing shifter circuit 22 must be coupled to the tacho-generator 12. The circuit 22 also requires throttle valve position data so as to initiate the cancelation of late timing when the throttle valve is opened. This latter connection however is not absolutely necessary, in particular if engine braking is defined to include the condition of closed throttle and idling in addition to closed throttle and above-idle speeds.

Depending on the magnitude of the signal of the timing shifter circuit 22, the timing controller 20 shifts the moment of timing in the direction of retardation from the time which corresponds to the instantaneous values of engine speed and pressure, and the synchronizing circuit 23 translates this new value into a particular timing angle.

The fuel enrichment circuit 33 which feeds into the pulse generator circuit 30 includes a component which recognizes the termination of engine braking. Furthermore, it contains a timing circuit which permits the provision of an enriched fuel-air mixture for a predetermined period of time.

Following the pulse control circuit 30 is a clipper circuit 31 which interrupts the supply of fuel to the engine or to the induction tube during engine braking so as to conserve fuel and to permit the full effect of engine braking on the speed of the vehicle. The circuit 31 may act to suppress or cut off the transmission of the fuel control pulses from the pulse control circuit 30 to the fuel injection valves 32.

Figure 6:
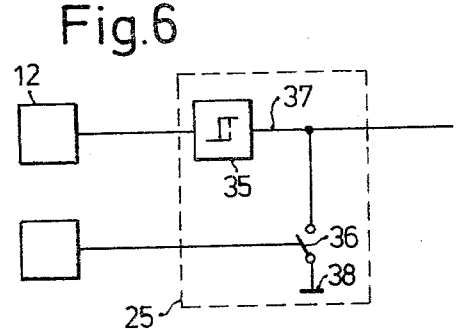
FIG. 6 is a circuit diagram of one embodiment of an engine braking recognition circuit.

An engine braking detector such as the element 25 may be embodied as illustrated in FIG. 6 where it is shown to contain a threshold switch 35 which receives the engine speed signal from the tacho-generator 12 as well as a switch 36 between an output line 37 and the ground connection 38. In the illustrated position, the switch 36 shows the conditions at idling speed in which the signal on the line 37 is the output signal of the threshold switch 35 and thus depends on engine speed alone. When the engine operates at other than idling speed, the switch 36 is closed so that the voltage on the line 37 is at ground potential independently of the action of the threshold switch 37 and of engine speed. Preferably, the threshold switch 35 has internal hysteresis so as to provide different thresholds for defining the onset and termination of engine braking.

Figure 7:
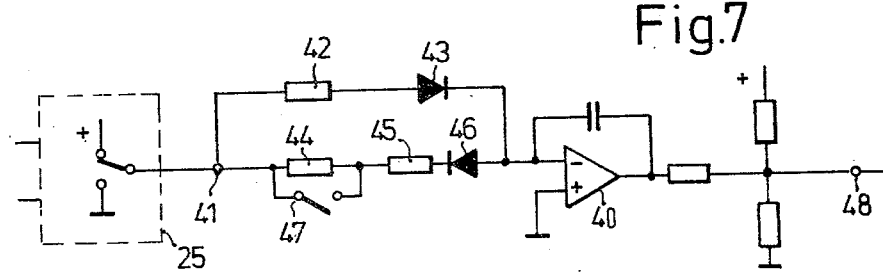
FIG. 7 is a circuit diagram of an embodiment of an engine timing control circuit.

A timing shifter circuit such as the element 22 in FIG. 5 may be embodied as illustrated in FIG. 7 where it is seen to include an integrator or amplifier 40 as its basic component. An input junction 41 joins two parallel branches which are rejoined at the negative input of the amplifier 40. The first branch includes a resistor 42 and a diode 43 connected to pass positive input signals, whereas the second branch includes series-connected resistors 44 and 45 connected in series with a diode 46 connected in opposite polarity to the diode 43. The resistor 44 may be shunted by a switch 47 which responds to throttle valve position and is open at engine idle. The output 48 of the timing shifter circuit 22 carries an engine brake-dependent output signal and the resistor 42 controls the rate of the change in timing as depicted in FIG. 4d, while the resistors 44 and 45 determine the time behavior of the ignition shift in the vicinity of the termination of engine braking, as depicted in FIG. 2. The resistor 45 and the switch 47 together determine the characteristics illustrated in FIG. 3.

An overall apparatus for utilizing the invention in a pneumatically acting configuration is illustrated in FIG. 8. Shown here are a known ignition distributor 50 having a double-acting pressure cell 51, an air filter 52 ahead of an air induction tube 53 including a throttle valve 54, an intake manifold 55 and a greatly simplified representation of an internal combustion engine. Disposed between one input of the double-acting pressure cell 51 and the induction tube 53 or the induction manifold 55 is an auxiliary volume 61 which is connected to the induction tube 53 via a first branch containing a throttle 62 and a second branch containing a second throttle 63 and a solenoid valve 64. The auxiliary volume 61 is connected to the intake manifold 55 via a throttle 65 and a further solenoid valve 66. The auxiliary volume 61 may in practice be constituted by the internal volume and the connecting conduits of the double-acting pressure cell 51.

The pressure within the auxiliary volume 61 may be controlled in dependence on engine speed and throttle valve angle so that the double-acting pressure cell 51 receives an actuating signal for changing the engine timing. The manner in which the solenoid valves 64 and 66 are controlled is illustrated in FIG. 9. In the unenergized state, the solenoid valve 66 is pneumatically closed while the magnetic valve 64 operates in the reverse sense. FIG. 9 illustrates the series connection of a throttle valve switch 70 with a parallel circuit consisting of a first branch having in it the solenoid valve 64 alone and having a second branch in which an rpm-dependent switch 71 and the solenoid valve 66 are disposed. The entire circuit is connected between a positive supply line 72 and a negative supply line 73. The rpm-dependent switch 71 is preferably provided with hysteresis, i.e., it is closed above the fuel cut-off speed nA and remains closed until the engine speed has dropped below the fuel resupply speed nW. The switch 70 is a throttle valve switch of known construction whose contacts are closed when the throttle valve is closed. The function of the circuit illustrated in FIG. 9 is to open the solenoid valve 64 when the throttle valve is closed. The solenoid valve 66, on the other hand, also depends on engine speed and it opens when the throttle valve is closed and the engine speed is above the fuel cut-off speed nA or below the fuel resupply speed nW. As shown in FIG. 8, the auxiliary volume 61 is always connected to the induction tube 53 via the throttle 62 independently of any throttle valve or engine speed signals.

While the throttle 65 and the solenoid valve 66 jointly determine the time characteristics of the ignition angle as depicted in FIG. 4d, the throttle 63 and 65 together determine the function illustrated in FIG. 3.

A variant of the pneumatic embodiment of the invention illustrated in FIG. 4 would dispense with the throttle 63 and the solenoid valve 64. In that case, the ignition angle shift would be retained on the basis of throttle angle and engine speed.

The foregoing relates to preferred exemplary embodiments of the invention, it being understood that other embodiments and variants thereof are possible within the spirit and scope of the invention.

What is claimed and desired to be secured by Letters Patent of the United States is:

1. A method for controlling the operation of an internal combustion engine during and after engine braking comprising the steps of:
   retarding the ignition timing of said engine for a limited time during and after engine braking;
   terminating fuel supply to said engine at the end of an interval after the retardation of timing,
   completing the process of said timing retardation before fuel shut-off;
   during a subsequent momentary period of acceleration maintaining retardation of said ignition timing; and
   thereafter returning the ignition timing of said engine to normal setting in a preselectable manner in order to insure smooth and gentle transition from normal operation of said vehicle to engine braking.

2. A method according to claim 1, including the further step of:
   providing a signal related to at least one engine variable for initiating the return of said ignition timing to a normal setting and wherein said at least one engine variable is selected from the group consisting of throttle plate angle of opening and engine speed (rpm).

3. A method according to claim 2, wherein the return of the ignition timing to a normal setting takes place as a linear function of time.

4. A method according to claim 2, wherein the return of the retardation of the timing is linear with respect to time and takes place within a selectable time interval.

5. A method according to claim 2, wherein the return of said ignition timing to a normal setting takes place in dependence on at least one engine variable selected from the class consisting of engine speed, induction tube pressure and air flow rate.

6. A method according to claim 1, including the further step of increasing the amount of fuel supplied to the engine near the termination of engine braking.

7. An apparatus for controlling an internal combustion engine during and after engine braking comprising
throttle valve position indicator means (13) coupled to a throttle plate (54),
fuel control means (11),
ignition timing means (10),
transducers for generating signals related to engine speed and to engine load,
engine braking detector circuit means (25) for receiving said transducer generated signals related to engine speed and engine load and for generating a signal indicative of engine braking which can be selectively applied to said ignition timing means and to said fuel control means for respectively changing the ignition timing and the fuel flow to the engine during and after generation of said engine braking signal, said timing means including a timing shifter circuit which is an electro-pneumatic device for changing the adjustment of the engine timing and which includes a chamber which is connected to an induction tube of the engine at least at one of the positions upstream of said throttle plate and downstream of said throttle plate, said chamber being connected via a throttle (65) and a solenoid valve (66) to the induction tube manifold (55), the coil of said solenoid valve (66) being energized via an engine speed-dependent switch (71) and a further switch (70) whose switching state depends on the angle of opening of the said throttle plate, the coil of said solenoid valve and said switches (70 and 71) being connected in electrical series.

8. An apparatus according to claim 7, wherein said engine braking detector circuit means includes a threshold switch activated by said engine speed signal and wherein said engine load transducer is a throttle plate angle indicator and wherein said detector circuit further includes junction means for joining the output signal of said threshold switch and of said throttle plate angle transducer.

9. An apparatus according to claim 7, wherein said ignition timing means includes a timing shifter circuit including a timing member whose operation may be selectively influenced by at least one of said signals related to engine speed, throttle plate opening angle and engine braking.

10. An apparatus according to claim 7, wherein said fuel control means includes a fuel cut-off device having a control pulse clipper stage.

11. An apparatus according to claim 7, wherein said chamber is connected via throttle means to a location at which substantially atmospheric pressure prevails.

12. An apparatus according to claim 11, wherein said throttle means (62, 63 and 65) are embodied as pulse actuated solenoid valves.

13. An apparatus according to claim 7, wherein a coil of a further solenoid valve is connected in parallel with said switch and the coil of said solenoid valve.

14. An apparatus according to claim 7, wherein said throttle means are embodied as pulse actuated solenoid valves.

15. An apparatus according to claim 7, wherein said fuel control means includes a fuel enrichment device embodied as a pulse prolongation circuit for prolonging the fuel control pulses of said fuel control means.

* * * * *